(12) United States Patent  (10) Patent No.: US 6,571,132 B1
Davis et al.  (45) Date of Patent: May 27, 2003

(54) COMPONENT TYPE ADAPTATION IN A TRANSDUCER ASSEMBLY

(75) Inventors: Dale S. Davis, Prior Lake, MN (US); Glen Larson, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/520,292

(22) Filed: Mar. 7, 2000

Related U.S. Application Data

(60) Provisional application No. 60/156,369, filed on Sep. 28, 1999.

(51) Int. Cl.[7] ............................................. G05B 19/18
(52) U.S. Cl. ............................ 700/2; 700/3; 700/11; 710/8; 710/11; 713/100
(58) Field of Search .................. 700/2–3, 11, 282; 710/8, 11; 713/100

(56) References Cited

U.S. PATENT DOCUMENTS

| | | | |
|---|---|---|---|
| 3,701,280 A | 10/1972 | Stroman | 73/861.02 |
| 3,968,694 A | 7/1976 | Clark | 73/724 |
| 4,120,206 A | 10/1978 | Rud, Jr. | 73/718 |
| 4,125,027 A | 11/1978 | Clark | 73/724 |
| 4,238,825 A | 12/1980 | Geery | 702/46 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 702/45 |
| 4,419,898 A | 12/1983 | Zanker et al. | 73/861.02 |
| 4,446,730 A | 5/1984 | Smith | 73/301 |

(List continued on next page.)

FOREIGN PATENT DOCUMENTS

| | | | |
|---|---|---|---|
| DE | 37 41 648 A1 | 7/1988 | |
| DE | 197 45 244 A1 | 4/1998 | ............ G01D/11/30 |
| DE | 299 03 260 U1 | 5/2000 | |
| EP | 0 063 685 A1 | 11/1982 | ............ G01F/23/14 |
| EP | 0 167 941 A2 | 6/1985 | |
| EP | 0 214 801 A1 | 3/1987 | ............ G01F/23/14 |
| EP | 0 223 300 A2 | 5/1987 | ............. G01F/1/36 |
| EP | 0 268 742 A1 | 7/1987 | |
| EP | 639039 A1 | 2/1995 | |
| EP | 0 903 651 A1 | 3/1999 | |
| JP | 2000121470 | 10/1998 | ............. G01L/9/04 |
| WO | WO 88/01417 | 2/1988 | ............ G08C/19/10 |
| WO | WO 89/02578 | 3/1989 | ............ G01D/21/00 |
| WO | WO 89/04089 | 5/1989 | ............ H03M/1/00 |
| WO | WO 90/15975 | 12/1990 | ............. G01L/7/08 |
| WO | WO 91/18266 | 11/1991 | ............ G01F/23/14 |
| WO | WO 96/34264 | 10/1996 | ............. G01L/9/00 |
| WO | WO 98/48489 | 10/1998 | ............ H01R/27/02 |
| WO | WO 00/23776 | 4/2000 | |

OTHER PUBLICATIONS

"Notification of Transmittal of the International Search Report or the Declaration" PCT/US01/13993.

(List continued on next page.)

Primary Examiner—Thomas Black
Assistant Examiner—Crystal J. Barnes
(74) Attorney, Agent, or Firm—Westman, Champlin & Kelly, P.A.

(57) ABSTRACT

A transducer intraconnection bus connects a limited number of transducer components chosen from a larger number of types of transducer components. The transducer components include functional variations in plant communication protocol, fluid variable, operator control, embedded control and display functional variations. One transducer component is a sensor module that exchanges type data over the transducer intraconnection bus during an adaptation interval. At the end of the adaptation interval, a method of communication is selected that is adaptable to the types connected. During an operational interval following the adaptation interval, the selected method of communication is used on the transducer intraconnection bus.

15 Claims, 13 Drawing Sheets

U.S. PATENT DOCUMENTS

| | | |
|---|---|---|
| 4,455,875 A | 6/1984 | Guimard et al. ............... 73/708 |
| 4,485,673 A | 12/1984 | Stern ....................... 73/304 C |
| 4,528,855 A | 7/1985 | Singh .......................... 73/721 |
| 4,562,744 A | 1/1986 | Hall et al. ............... 73/861.02 |
| 4,598,381 A | 7/1986 | Cucci ......................... 702/138 |
| 4,602,344 A | 7/1986 | Ferretti et al. ................. 702/55 |
| 4,617,607 A | 10/1986 | Park et al. ............... 361/283.4 |
| D287,827 S | 1/1987 | Broden ....................... D10/46 |
| 4,644,797 A | 2/1987 | Ichikawa et al. ............. 73/706 |
| 4,653,330 A | 3/1987 | Hedtke ........................ 73/756 |
| 4,677,841 A | 7/1987 | Kennedy ................... 73/30.02 |
| 4,745,810 A | 5/1988 | Pierce et al. .................. 73/706 |
| D296,995 S | 8/1988 | Lee .............................. D10/46 |
| D297,314 S | 8/1988 | Hedtke ........................ D10/46 |
| D297,315 S | 8/1988 | Pierce et al. ................. D10/85 |
| 4,783,659 A | 11/1988 | Frick ..................... 340/870.37 |
| 4,791,352 A | 12/1988 | Frick et al. .................... 324/60 |
| 4,798,089 A | 1/1989 | Frick et al. .................... 73/706 |
| 4,818,994 A | 4/1989 | Orth et al. ............. 340/870.21 |
| 4,825,704 A | 5/1989 | Aoshima et al. ......... 73/861.42 |
| 4,833,922 A | 5/1989 | Frick et al. .................... 73/756 |
| 4,850,227 A | 7/1989 | Luettgen et al. ............... 73/708 |
| 4,866,989 A | 9/1989 | Lawless ....................... 73/756 |
| 4,881,412 A | 11/1989 | Northedge ............... 73/861.04 |
| 4,930,353 A | 6/1990 | Kato et al. .................... 73/727 |
| 4,958,938 A | 9/1990 | Schwartz et al. ........... 374/208 |
| 4,970,898 A | 11/1990 | Walish et al. ................. 73/706 |
| 4,980,675 A | 12/1990 | Meisenheimer, Jr. ....... 340/626 |
| 5,000,047 A | 3/1991 | Kato et al. .................... 73/706 |
| D317,266 S | 6/1991 | Broden et al. ............... D10/46 |
| D317,269 S | 6/1991 | Selg ............................. D10/52 |
| D318,432 S | 7/1991 | Broden et al. ............... D10/46 |
| 5,028,746 A | 7/1991 | Petrich .................. 191/12.2 R |
| 5,035,140 A | 7/1991 | Daniels et al. ................ 73/290 |
| 5,051,937 A | 9/1991 | Kawate et al. .............. 702/104 |
| 5,058,437 A | 10/1991 | Chaumont et al. ........ 73/861.21 |
| 5,060,108 A | 10/1991 | Baker et al. ................. 361/283 |
| 5,070,732 A | 12/1991 | Duncan et al. ............... 73/431 |
| 5,083,091 A | 1/1992 | Frick et al. .................. 324/678 |
| 5,087,871 A | 2/1992 | Losel .......................... 323/299 |
| 5,094,109 A | 3/1992 | Dean et al. ................... 73/718 |
| D329,619 S | 9/1992 | Cartwright ................... D10/52 |
| 5,142,914 A | 9/1992 | Kusakabe et al. ............. 73/723 |
| 5,157,972 A | 10/1992 | Broden et al. ................. 73/718 |
| 5,162,725 A | 11/1992 | Hodson et al. .............. 324/115 |
| 5,187,474 A | 2/1993 | Kielb et al. ............ 340/870.18 |
| 5,212,645 A | 5/1993 | Wildes et al. ............... 364/463 |
| 5,227,782 A | 7/1993 | Nelson .................. 340/870.11 |
| 5,236,202 A | 8/1993 | Krouth et al. ............... 277/644 |
| 5,245,333 A | 9/1993 | Anderson et al. ........ 340/870.3 |
| 5,248,167 A | 9/1993 | Petrich et al. ................. 285/23 |
| D342,456 S | 12/1993 | Miller et al. ................. D10/60 |
| 5,276,631 A | 1/1994 | Popovic et al. ............. 702/104 |
| 5,287,746 A | 2/1994 | Broden ........................ 73/706 |
| 5,353,200 A | 10/1994 | Bodin et al. ................. 361/816 |
| 5,369,386 A | 11/1994 | Alden et al. ................. 335/206 |
| 5,377,547 A | 1/1995 | Kusakabe et al. ............. 73/723 |
| 5,381,355 A | 1/1995 | Birangi et al. ............... 708/303 |
| D358,784 S | 5/1995 | Templin, Jr. et al. ........ D10/96 |
| 5,436,824 A | 7/1995 | Royner et al. ................. 363/89 |
| 5,448,180 A | 9/1995 | Kienzler et al. .............. 326/15 |
| 5,469,150 A | 11/1995 | Sitte ...................... 340/825.07 |
| 5,471,885 A | 12/1995 | Wagner ................. 73/862.041 |
| D366,000 S | 1/1996 | Karas et al. ................. D10/85 |
| D366,218 S | 1/1996 | Price et al. .................. D10/52 |
| 5,495,768 A | 3/1996 | Louwagie et al. ............ 73/706 |
| 5,498,079 A | 3/1996 | Price .......................... 374/208 |
| 5,502,659 A | 3/1996 | Braster et al. ............... 702/104 |
| 5,524,333 A | 6/1996 | Hogue et al. ................. 29/593 |
| 5,524,492 A | 6/1996 | Frick et al. .................... 73/706 |
| 5,546,804 A | 8/1996 | Johnson et al. ............... 73/431 |
| 5,600,782 A | 2/1997 | Thomson ....................... 714/4 |
| 5,606,513 A | 2/1997 | Louwagie et al. .......... 702/138 |
| 5,650,936 A | 7/1997 | Loucks et al. ............... 364/483 |
| 5,656,782 A | 8/1997 | Powell, II et al. ............ 73/756 |
| 5,665,899 A | 9/1997 | Willcox ...................... 73/1.63 |
| 5,668,322 A | 9/1997 | Broden ......................... 73/756 |
| 5,669,713 A | 9/1997 | Schwartz et al. ............... 374/1 |
| 5,670,722 A | 9/1997 | Moser et al. .................. 73/756 |
| 5,677,476 A | 10/1997 | McCarthy et al. ......... 73/29.01 |
| 5,710,552 A | 1/1998 | McCoy et al. .......... 340/870.21 |
| 5,754,596 A | 5/1998 | Bischoff et al. ............. 375/295 |
| 5,764,928 A * | 6/1998 | Lanctot ...................... 710/105 |
| 5,823,228 A | 10/1998 | Chou .......................... 137/597 |
| 5,870,695 A | 2/1999 | Brown et al. ............... 702/138 |
| 5,899,962 A | 5/1999 | Louwagie et al. .......... 702/138 |
| 5,920,016 A | 7/1999 | Broden ......................... 73/756 |
| 5,948,988 A | 9/1999 | Bodin .......................... 73/706 |
| 5,954,526 A | 9/1999 | Smith ......................... 439/136 |
| 5,955,684 A | 9/1999 | Gravel et al. .............. 73/866.5 |
| 5,973,942 A | 10/1999 | Nelson et al. ................. 363/21 |
| 5,988,203 A | 11/1999 | Hutton ....................... 137/271 |
| 6,002,996 A * | 12/1999 | Burks et al. ................ 702/188 |
| 6,005,500 A | 12/1999 | Gaboury et al. .............. 341/43 |
| 6,006,338 A | 12/1999 | Longsdorf et al. .......... 713/340 |
| 6,013,108 A * | 1/2000 | Karolys et al. ............. 702/189 |
| 6,035,240 A * | 3/2000 | Moorehead et al. ........... 700/2 |
| 6,038,927 A | 3/2000 | Karas .......................... 73/706 |
| 6,047,219 A * | 4/2000 | Eidson ......................... 700/2 |
| 6,050,145 A | 4/2000 | Olson et al. .................. 73/706 |
| 6,058,441 A * | 5/2000 | Shu ............................ 710/100 |
| 6,059,254 A | 5/2000 | Sundet et al. ............... 248/678 |
| 6,105,437 A | 8/2000 | Klug et al. .................... 73/756 |
| 6,111,888 A | 8/2000 | Green et al. ................. 370/461 |
| 6,115,831 A | 9/2000 | Hanf et al. .................... 714/43 |
| 6,123,585 A | 9/2000 | Hussong et al. ............. 439/652 |
| 6,131,467 A | 10/2000 | Miyano et al. ................ 73/756 |
| 6,140,952 A | 10/2000 | Gaboury ..................... 341/143 |
| 6,151,557 A | 11/2000 | Broden et al. ................. 702/47 |
| 6,175,770 B1 * | 1/2001 | Bladow .......................... 700/2 |
| D439,177 S | 3/2001 | Fandrey et al. ............. D10/85 |
| D439,178 S | 3/2001 | Fandrey et al. ............. D10/85 |
| D439,179 S | 3/2001 | Fandrey et al. ............. D10/85 |
| D439,180 S | 3/2001 | Fandrey et al. ............. D10/85 |
| D439,181 S | 3/2001 | Fandrey et al. ............. D10/85 |
| 6,216,172 B1 | 4/2001 | Koblin et al. ............... 709/253 |
| D441,672 S | 5/2001 | Fandrey et al. ............. D10/85 |
| 6,233,532 B1 | 5/2001 | Boudreau et al. ............. 702/89 |
| 6,285,964 B1 | 9/2001 | Babel et al. ................. 702/121 |
| 6,295,875 B1 | 10/2001 | Frick et al. .................... 73/718 |
| 6,311,568 B1 | 11/2001 | Kleven .................... 73/861.42 |
| 6,321,166 B1 | 11/2001 | Evans et al. .................. 702/50 |
| 6,415,188 B1 * | 7/2002 | Fernandez et al. ............ 700/67 |
| 6,421,570 B1 * | 7/2002 | McLaughlin et al. .......... 700/2 |
| 6,457,367 B1 | 10/2002 | Behm et al. .................. 73/753 |
| 6,484,107 B1 | 11/2002 | Nelson et al. ................. 702/50 |
| 6,487,912 B1 | 12/2002 | Nelson et al. ................. 73/753 |

OTHER PUBLICATIONS

International Search Report from the European Patent Office for International Application No. PCT/US 01/14521 filed May 4, 2001.

"Notification of Transmittal of the International Search Report or the Declaration" of International Application No. PCT/US00/26563.

"MicroLAN Design Guide", Dallas Semiconductor, Tech Brief No. 1, (undated).

"Bosch CAN Specification Version 2.0", by Robert Bosch GmbH, pp. 1–68 including pp. –1– and –2–, (Sep. 1991).

Product Data Sheet No. 00813-0100-4360, "Model 1151 Alphaline® Pressure Transmitters", by Rosemount Inc., (1997).

Product Sheet No. 00813-0100-4001, "Digital Pressure Transmitter for Pressure, Flow, and Level Measurement", by Rosemount Inc., (1998).

"Claudius Ptolemy (100?-170? AD)", *M&C News*, 7 pages, (Apr. 1994).

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15, 2000.

U.S. patent application Ser. No. 09/564,506, Nord et al., filed May 4, 2000.

U.S. patent application Ser. No. 09/667,289, Westfield et al., filed Sep. 22, 2000.

U.S. patent application Ser. No. 09/667,399, Behm et al., filed Sep. 21, 2000.

U.S. patent application Ser. No. 09/671,130, Fandrey et al., filed Sep. 27, 2000.

Product Data Sheet No: 00813-0100-4378, "Model 751 Field Signal Indicator", by Rosemount Inc., Eden Prairie, Minnesota, (1997).

Product Data Sheet No: 00813-0100-4731, "APEX™ Radar Gauge", by Rosemount Inc., Eden Prairie, Minnesota, (1998).

Product Data Sheet No: 00813-0100-4640, "Model 3201 Hydrostatic Interface Unit", from the Rosemount Comprehensive Product Catalog, published 1998, by Rosemount Inc., Eden Prairie, Minnesota.

Product Data Sheet No: 00813-0100-4003, "Model 8800A", by Rosemount Inc., Eden Prairie, Minnesota, (1998).

Product Data Sheet No: 00813-0100-4773, "Model 8742C-Magnetic Flowmeter Transmitter with FOUNDATION™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No: 00813-0100-4263, "Model 444 Alphaline® Temperature Transmitters", by Rosemount Inc., Eden Prairie, Minnesota, (1997).

Product Data Sheet No: 00813-0100-4769, "Model 3244MV Multivariable Temperature Transmitter with FOUNDATION™ Fieldbus", by Rosemount Inc., Eden Prairie, Minnesota, (1998).

Product Data Sheet No: 00813-0100-4724, "Models 3144 and 3244MV Smart Temperature Transmitters", by Rosemount Inc., Eden Prairie, Minnesota, (1998).

Product Data Sheet No: 00813-0100-4738, "Model 3095FB Multivariable™ Transmitter with Modbus™ Protocol", by Rosemount Inc., Eden Prairie, Minnesota, (1996, 1997).

Product Data Sheet No: 00813-0100-4698, "Model 2090F Sanitary Pressure Transmitter", by Rosemount Inc., Eden Prairie, Minnesota, (1998).

Product Data Sheet No: 00813-0100-4690, "Model 2088 Economical Smart Pressure Transmitter", by Rosemount Inc., Eden Prairie, Minnesota, (1998).

Product Data Sheet No: 00813-0100-4592, "Model 2024 Differential Pressure Transmitter", by Rosemount Inc., Eden Prairie, Minnesota, (1987-1995).

Product Data Sheet No: 00813-0100-4458, "Model 1135F Pressure-to-Current Converter", by Rosemount Inc., Eden Prairie, Minnesota, (1983, 1986, 1994).

"Single Chip Senses Pressure and Temperature," *Machine Design*, 64 (1992) May 21, No. 10.

Brochure: "Reduce Unaccounted-For Natural Gas with High-Accuracy Pressure Transmitters," Rosemount Inc. Measurement Division, Eden Prairie, Minnesota, ADS 3073, May 1991, pp. 1–4.

Technical Information Bulletin, "Liquid Level Transmitter Model DB40RL Sanitary Sensor *deltapilot*," Endress + Hauser, Greenwood, Indiana, Sep. 1992, pp. 1–8.

"The Digitisation of Field Instruments" W. Van Der Bijl, *Journal A*, vol. 32, No. 3, 1991, pp. 62–65.

Specification Summary, "TELETRANS™ 3508-30A Smart Differential Pressure Transmitter," (undated) Bristol Babcock, Inc., Watertown, CT, 06795.

Specification Summary, "TELETRANS™ 3508-10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL Flush-Mount Hydrostatic Pressure Transmitter," Jul. 1992, Rosemount Inc., Eden Prairie, MN 55344.

"Flow Measurement," *Handbook of Fluid Dynamics*, V. Streeter, Editor-in-chief, published by McGraw-Hill Book Company, Inc. 1961, pp. 14–4 to 14–15.

"Precise Computerized In-Line Compressible Flow Metering," *Flow –Its Measurement and Control in Science and Industry*, vol. 1, Part 2, Edited by R. Wendt, Jr., Published by American Institute of Physics et al, (undated) pp. 539–540.

"A Systems Approach," Dr. C. Ikoku, *Natural Gas Engineering*, PennWell Books, (undated) pp. 256–257.

"Methods for Volume Measurement Using Tank-Gauging Devices Can Be Error Prone," F. Berto, *The Advantages of Hydrostatic Tank Gauging Systems*, undated reprint from *Oil & Gas Journal*.

"Hydrostatic Tank Gauging –Technology Whose Time Has Come," J. Berto, *Rosemount Measurement Division Product Feature*, undated reprint from *INTECH*.

"Pressure Sensors Gauge Tank Level and Fluid Density," *Rosemount Measurement Division Product Feature*, undated reprint from *Prepared Foods* (Copyrighted 1991 by Gorman Publishing Company).

"Low Cost Electronic Flow Measurement System," *Tech Profile*, May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit*, May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering*, Dec. 1992, Bristol Babcock, Inc., Watertown, CT 06795.

"Smart Transmitters Tear Up The Market," C. Polsonetti, *INTECH*, Jul. 1993, pp. 42–45.

American National Standard, "Hydraulic Fluid Power–Solenoid Piloted Industrial Valves–Interface Dimensions for Electrical Connectors", National Fluid Power Association, Inc., 10 pages, (Aug. 1981).

2 pages downloaded from http://www.interlinkbt.com/PRODUCT/IBT_PROD/DN/CN–DM_PN/EURO–DP.HTM dated Sep. 15, 2000.

4 pages downloaded from http://www.interlinkbt.com/PRODUCT/IBT_PROD/dn/EUR–CON/euro–fwc.htm dated Sep. 15, 2000.

3 pages from TURK Cable Standards, by Turk, Inc., Minneapolis, Minnesota.

"Notification of Transmittal of the International Search Report or the Declaration" for International Application No. PCT/US00/26488.

"Notification of Transmittal of the International Search Report or the Declaration" for International Application No. PCT/US00/26561.

* cited by examiner

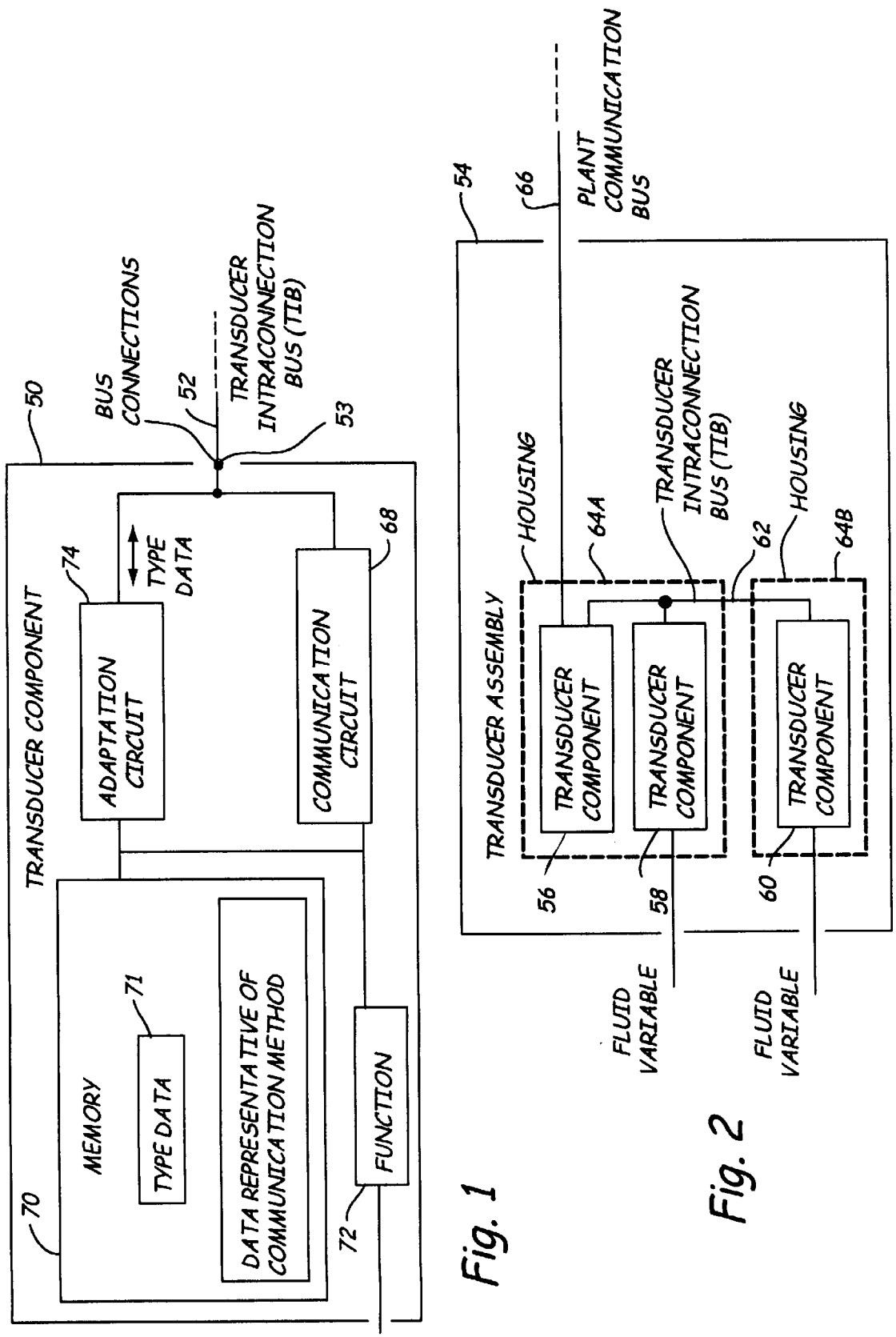

COMPONENT TYPE ADAPTATION IN A TRANSDUCER ASSEMBLY

REFERENCE TO CO-PENDING APPLICATION

U.S. Provisional patent application 60/156,369 entitled UNITIZED MODULARITY IN A PROCESS TRANSMITTER filed on Sep. 28, 1999 is hereby incorporated by reference.

BACKGROUND OF THE INVENTION

The present invention relates to industrial processing plants. More particularly, the present invention relates to transmitters and other transducers used to measure process variables in such plants.

Transducers of many types, for example, pressure transmitters, are manufactured in an increasing number of variations to meet the differing needs of many different kinds of plant control systems. There are variations in the amount of control function embedded in the transducer, variations in plant communication protocol, and also variations in the amount of data displayed and operator controls in the transducer.

Increasingly, transducers are manufactured in variations that transduce multiple variables of different types. Model 3095MV Multivariable Flow Transmitter manufactured by Rosemount Inc. of Eden Prairie, Minnesota, for example, senses both a volumetric flow and a temperature and provides a transmitter output representing mass flow rate. Transducers are also manufactured that sense multiple variables of the same type, such as a differential pressure transmitter that senses two pressures and provides a transmitter output representative of flow or liquid level. With some of these multiple variable transducers, circuits in multiple transducer housing spaced a short distance apart are electrically connected to complete the transducer.

There is a desire to provide each such multiple variable transducer with many optional features so that it can be adjusted in the field to fit a wide variety of plant installation requirements. Electrical power limitations, size and cost constraints, and ease-of-installation needs, however, severely limit the number of variations that can be provided in a single transducer.

SUMMARY OF THE INVENTION

An improved modular transducer assembly is disclosed. Modules in the transducer assembly are connected by an improved transducer intraconnection bus.

The intraconnection bus senses which transducer components have been intraconnected in a particular installation and then specially adapts the method of communication used on the intraconnection bus to operate with the particular transducer components in that particular installation.

The transducer assembly includes only a limited number of transducer components, or modules, chosen from a larger number of interchangeable types of transducer components. The intraconnected transducer components include at least one transducer component of a type having a functional variation selected from the group of plant communication protocol, fluid variable, operator control, embedded control and display functional variations.

One intraconnected transducer component is a sensor module having a fluid variable sensor and an adaptation circuit that, during an adaptation interval, exchanges type data over the transducer intraconnection bus. At the end of the adaptation interval, the adaptation circuit stores data representing a selected method of communication that is adaptable to the types connected.

The sensor module has a communication circuit that, during an operational interval following the adaptation interval, uses the selected method of communication.

BRIEF DESCRIPTION OF THE DRAWINGS

FIG. 1 is a block diagram of an embodiment of a transducer component;

FIG. 2 is a block diagram of an embodiment of a transducer assembly;

DETAILED DESCRIPTION OF THE ILLUSTRATED EMBODIMENTS

Figure 3:
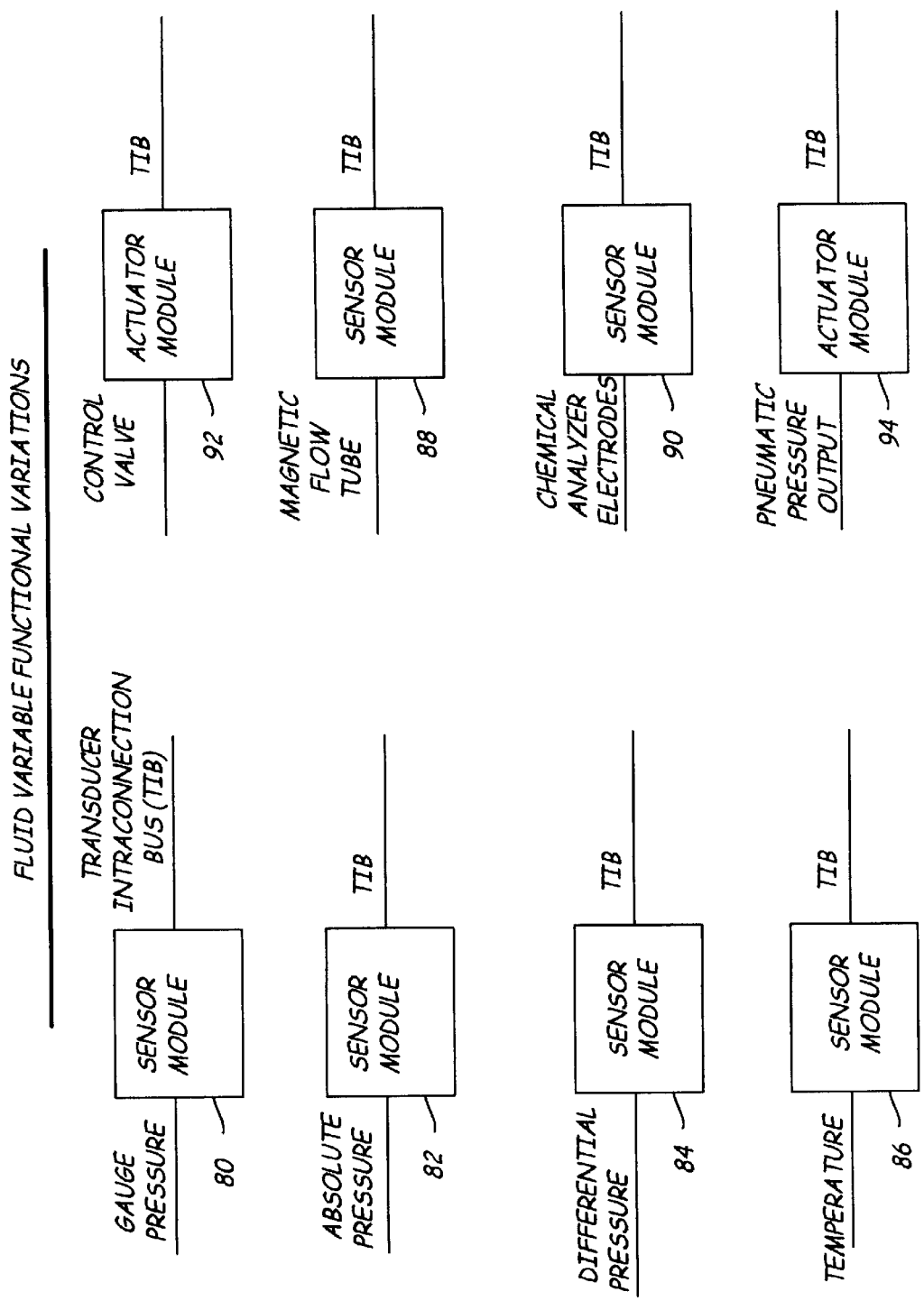
FIG. 3 illustrates functional variations of a type of transducer component that transduces fluid variables.

In the present invention, an improved modular transducer assembly, and an improved method of interchangeably intraconnecting transducer components together at an installation site, are provided.

An improved internal bus, or "intraconnection bus" electrically intraconnects transducer components together in a transducer assembly. The intraconnection bus senses which transducer components have been intraconnected in a particular installation and then specially adapts the method of communication used on the intraconnection bus to operate with the particular transducer components in that particular installation.

The improved intraconnection bus arrangement provides for a desired variation, or customization, of features in the transducers that fits within existing power limitations, size and cost constraints for field mounted transducers. The transducer assembly is easy to install while providing the particular variations needed in plant communication protocol, display, operator control, and type of control function for particular application.

FIG. 1 illustrates an embodiment of a modular transducer component 50 for such a transducer. As shown in FIG. 1, transducer component 50 has a bus connection 53 that connects to a transducer intraconnection bus (TIB) 52.

The transducer component 50 includes a communication circuit 68 coupled to the transducer intraconnection bus 52. Communication circuit 68 provides two way communication between bus 52 and other parts of transducer component 50. Communication circuit 68 typically includes a modem. Transducer component 50 also includes a memory 70 storing type data 71 that represents the particular type or configuration of transducer component 50 and distinguishes it from different interchangeable transducer components that have different configurations. Transducer component 50 also includes a function circuit 72 that includes a circuit that performs the physical or hardware functions of the transducer component 50. In some cases, the function circuit 72 will be a sensor circuit that is couplable to a fluid to sense a fluid property, and in other cases the function circuit will provide some interaction with the operator such as liquid crystal displays or operator controls. For example, a transducer component 50 that is a differential pressure sensor with a maximum range limit of 100 psi would include type data 71 identifying it as a differential pressure sensor and identifying its maximum range limit, along with other data concerning the transducer component's other characteristics.

Transducer component 50 also includes an adaptation circuit 74 that, during an adaptation interval, exchanges type data over the transducer intraconnection bus 52 with other transducer components; and, at the end of the adaptation interval, the transducer component 50 (which can be a sensor module or other module type) stores data 76 representing a selected method of communication that is adaptable to the types of transducer components connected in the particular transducer assembly.

It will be understood that adaptation circuit 74 can be connected to the transducer intraconnection bus 52 as shown, or alternatively may connect to the communication circuit 68 and access the transducer intraconnection bus via the communication circuit 68.

During an operational interval following the adaptation interval, the transducer component 50 uses the selected method of communication as explained in more detail below in connection with FIGS. 9–10.

FIG. 2 illustrates an embodiment of a transducer assembly 54 comprising transducer components 56, 58, and 60 which are similar to component 50 of FIG. 1. Components 56, 58 and 60 are intraconnected with a transducer intraconnection bus 62. Transducer assembly 54 comprises only a limited number of transducer components that are connected to and supportable by the transducer intraconnection bus which is routed within the transducer assembly 54.

Figure 4:
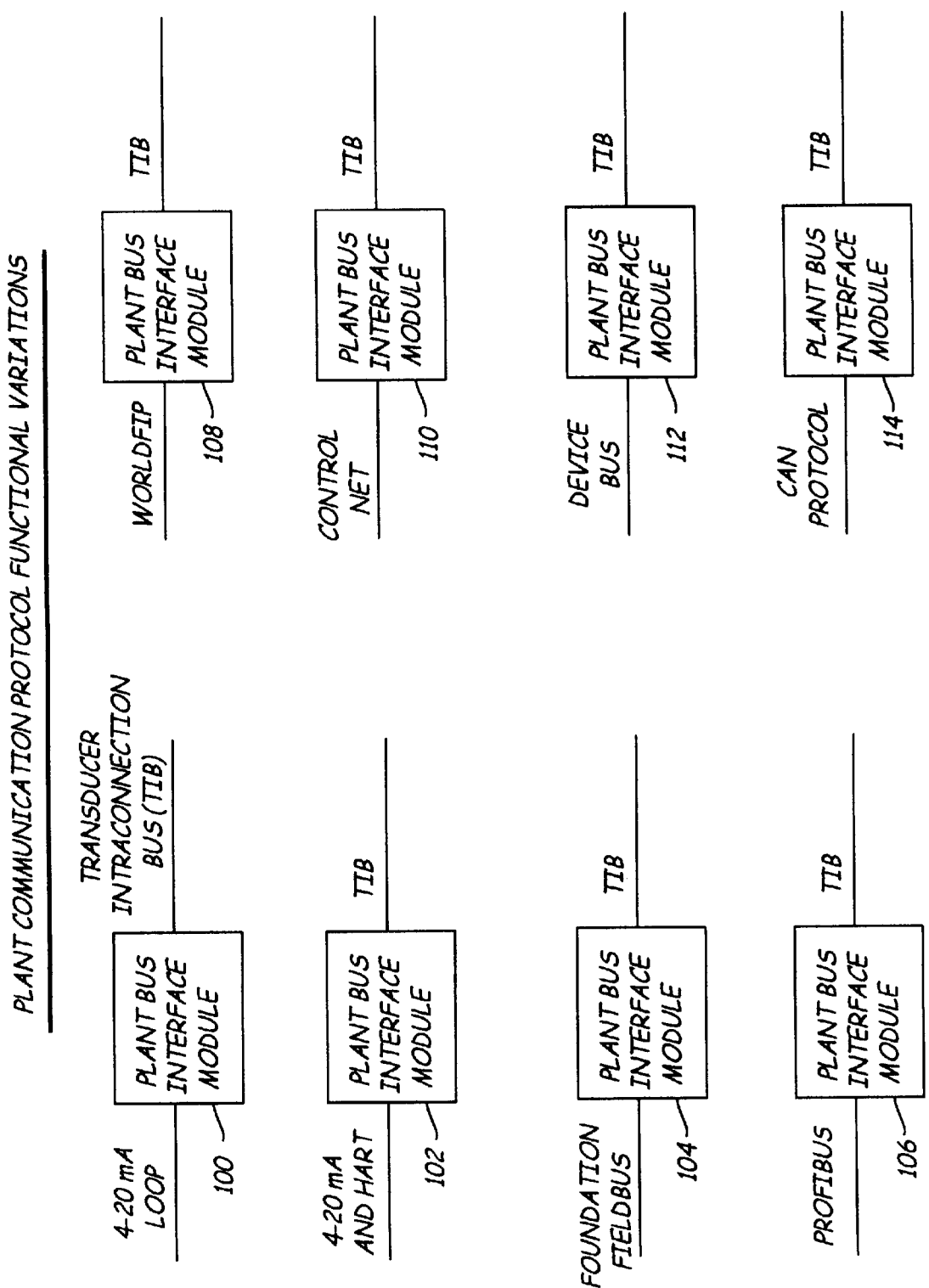
FIG. 4 illustrates functional variations of a type of transducer component that couples to a plant communication bus.
Figure 5:
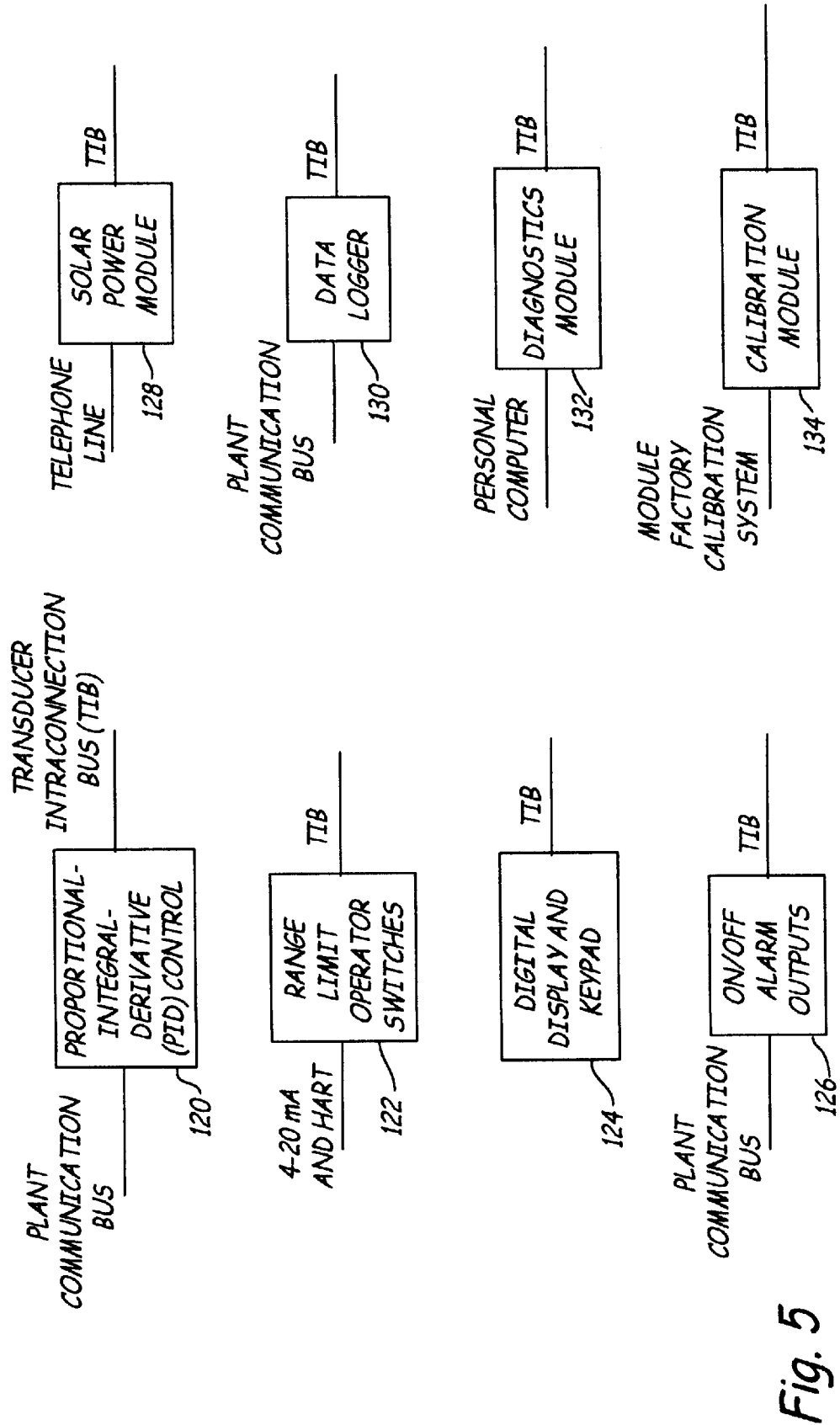
FIG. 5 illustrates functional variations of types of transducer components that provide operator control, embedded control, display and special purpose functions.

The transducer components in transducer assembly 54 are selected from any number of interchangeable types of transducer components such as those shown in connection with FIGS. 3–5. The transducer component 50 and the transducer assembly 54 are adapted for modularity and interchangeability. At least one transducer component in the transducer assembly 54 is of a type having a functional variation, and that provides modularity or choice of functions to customize the transducer assembly 54. Such variations within a type or group of transducer components can include plant communication protocol, fluid variable, operator control, embedded control and display functional variations.

The transducer assembly 54 can be threaded together as a single contiguous housing 64A, 64B. Housing 64A, 64B can alternatively be assembled as a first housing 64A coupled to a second housing 64B by a only a short cable carrying the transducer intraconnection bus 62. The transducer assembly 54 shown in FIG. 2 can, for example, comprise a multivariable transmitter. In a typical multivariable transmitter, transducer component 60 is a sensor module including a temperature sensor coupled to a fluid, transducer component 58 is a sensor module including a differential pressure sensor coupled across an orifice plate to measure flow of the fluid through the orifice plate and transducer component 56 is a feature board that computes mass flow rate based on the sensed temperature and differential pressure and provides a Fieldbus protocol output on line 66 to a plant communication bus.

In FIG. 3, exemplary variations of types of modules are illustrated. When a transducer component is a sensor module, it can be of various types including a gauge pressure sensor 80, an absolute pressure sensor 82, a differential pressure sensor 84, a temperature sensor 86, magnetic flow sensor 88, or a chemical analyzer sensor 90. When a transducer component is an actuator module, it can be of various types including a control valve 92 or a current to pressure converter 94. Each of these transducer modules illustrated in FIG. 3 includes stored type data identifying what type of transducer module it is. The types of modules illustrated are exemplary, however, other types of modules are contemplates such as volumetric flow meters and other known types of measurement devices.

In FIG. 4, exemplary variations of types of transducer components that are plant bus interface modules for communication over a plant interconnection bus are illustrated. When the transducer component is a plant bus interface module, it can be of various types including a 4–20 mA loop circuit 100, a 4–20 mA loop with HART communications 102, a foundation fieldbus circuit 104, a PROFIBUS circuit 106, a WORLDFIP circuit 108, a CONTROL NET circuit 110, a DEVICE BUS circuit 112, or a CAN circuit 114.

Using the variations illustrated in FIG. 4, a ransducer assembly can be assembled to meet only a ingle application need, keeping cost low. The ariations illustrated in FIG. 4 can be interchangeably used on pressure, temperature and flow transducer assemblies.

In FIG. 5, exemplary variations of types of transducer components that are types of operator control, embedded control function and display function components are illustrated. When the transducer component performs one of these functions, it can be, for example, a PID (proportional-integral-differential) controller 120, a circuit 122 providing operator controls such as range switches, a digital display and keypad 124, a circuit 126 providing ON/OFF alarm outputs, a module 128 for telephone line hookup with solar power for installations that are too remote for loop connection to the control system (typically pipeline installations), a data logger 130, a diagnostics module 132 that connects to a personal computer for troubleshooting, or a calibration module 134 for use in manufacturing sensor modules by entering calibration constants or data.

By providing only limited functionality in each transducer component as illustrated in FIG. 5, the high cost, size and electrical power consumption of combining many of the functions shown in FIG. 5 into one circuit board is avoided.

Figure 6:
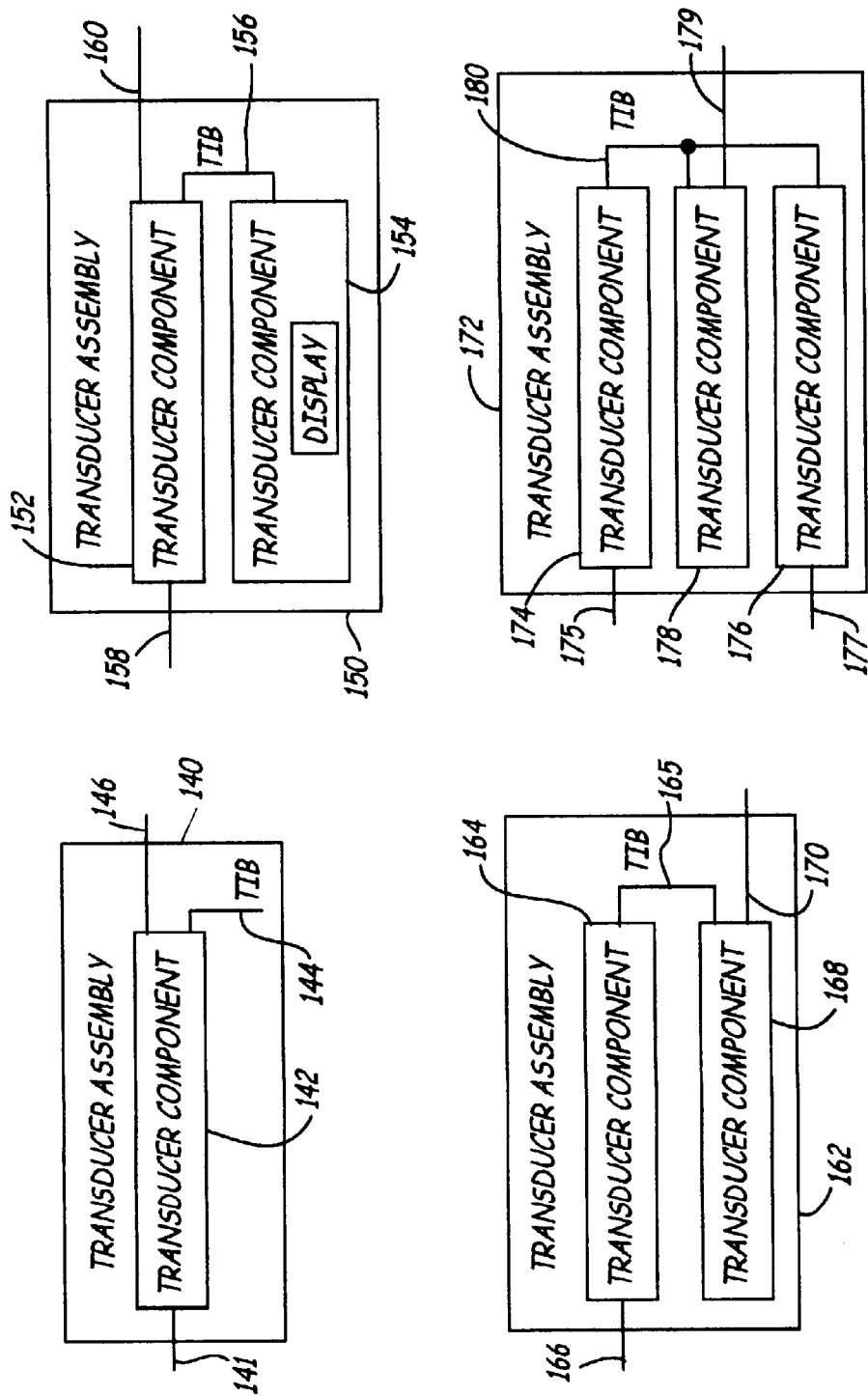
FIG. 6 illustrates various embodiments of intraconnection arrangements for transducer assemblies.

In FIG. 6, different embodiments of transducer assemblies can be assembled in varying configurations to meet the needs of a particular application. In addition to the modularity and interchangeability of having different types of transducer components to choose, different numbers of transducer components may be selected to fit the needs of the application. A transducer assembly 140 includes only a single transducer component 142. Transducer component 142 is a sensor module that senses fluid property 141 and that is field programmable so that, in addition to being able to communicate over an transducer intraconnection bus 144, it can be also be programmed to alternately provide a 4–20 mA plant interconnection bus type of output 146. Transducer assembly 140 includes only a single transducer component 142 and a terminal block in a housing to form a simple 4–20 mA pressure transmitter, for example.

In FIG. 6, a transducer assembly 150 comprises a transducer component 152 that is a sensor module and a transducer component 154 that is a liquid crystal display module. Transducer components 152, 154 communicate over a transducer intraconnection bus 156. Transducer component 152 senses a fluid property at 158 and provides a plant interconnection bus type of output on line 160.

In FIG. 6, a transducer assembly 162 includes a transducer component 164 that senses a fluid property at 166 and a transducer component 168 that provides a Foundation Fieldbus output at 170 for connection to a plant interconnection bus. The transducer components 164, 168 are intraconnected on a transducer intraconnection bus 165.

In FIG. 6, a transducer assembly 172 includes a transducer component 174 that senses a first fluid property 175 and a transducer component 176 that senses a second fluid property 177. A transducer component 178 provides a 4–20 mA loop with superimposed HART communications at 179 for connection to a plant interconnection bus. Transducer components 174, 176, 178 are intraconnected by a transducer intraconnection bus 180.

Using the variations illustrated in FIG. 6, a transducer assembly can be assembled using only the hardware needed for a specific application and the housings selected can be scaled accordingly to reduce size and weight in the transducer assembly.

Figure 7:
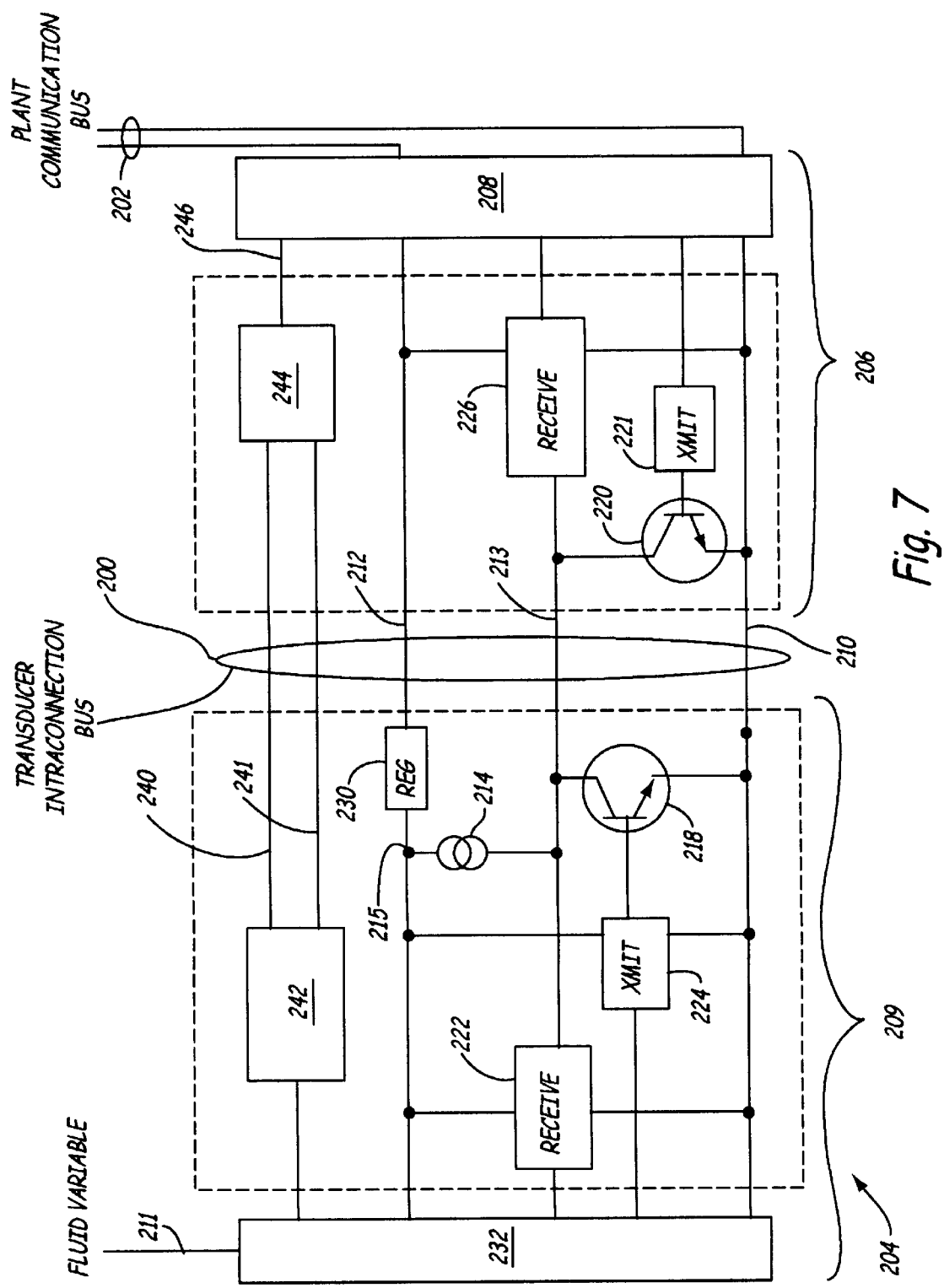
FIG. 7 illustrates an embodiment of a transducer intraconnection bus with 5 electrical conductors.

In FIG. 7, the arrangement and operation of an embodiment of a transducer intraconnection bus 200 is illustrated in more detail. A plant communication bus 202 (also called plant interconnection bus) is coupled to a transducer assembly 204. A first transducer component 206 includes a communications circuit 208 that is capable of bi-directional digital communication with bus 202 and also capable of bi-directional digital communication with bus 200. Communication circuit 208 converts serial communications formatted for the plant communication bus 202 to a format compatible with the transducer intraconnection bus 200 and vice versa. The transducer intraconnection bus 200 can use a communication protocol generally described by BOSCH CAN Specification Version 2.0, September 1991 Robert Bosch GmbH, Postfach 50, D-7000 Stuttgart 1, Germany, however, specially modified as described herein to adapt it for use as a transducer intraconnection bus protocol. Circuit 208 includes circuitry to limit electrical energy consumption of the transducer assembly 204.

A second transducer component 209 is also connected to the transducer intraconnection bus 200 and communicates with transducer component 206 over the bus 200 using bi-directional digital communications. Transducer component 209 is a sensor module and senses a fluid variable 211. Transducer component 209 preferably includes a delta sigma analog to digital converter circuit to provide high accuracy and resolution in sensing the fluid variable 211.

In FIG. 7, the intraconnection bus 200 includes a first conductor 210 that is a "DC common" or power supply return conductor for the intraconnection bus 200. Conductor 200 can also loosely be referred to as a "ground" conductor, although connection to ground is not essential. The intraconnection bus 200 also includes a second conductor 212 that is a power supply conductor that is preferably at a positive (+) potential with respect to the return conductor 210 and is used for sharing a limited amount of available power among the modules connected to the bus 200.

In FIG. 7, a third conductor 213 of the intraconnection bus 200 carries serial digital communication. A controlled current source 214 in the transducer component 209 (which is a sensor module) provided a controlled or limited current to the conductor 213 when there is an electrical load on conductor 213. When there is no load on conductor 213, the controlled current source 214 raises the potential on conductor 213 until it reaches the upper potential limit of the current source, typically near the potential on conductor 215. A switch 218 in transducer component 209 and a switch 220 in transducer component 206 are each connected between conductor 213 and conductor 210 in an arrangement known as a hard-wired OR function. When switch 218 is off, switch 220 can be actuated to draw current from current source 214, and when switch 220 is off, then switch 218 can be actuated to draw current from current source 214. Switch 220 is actuated by transmit circuit 221 to transmit data from transducer component 206 to a receiver circuit 222 in transducer component 209. Switch 218 is actuated by transmit circuit 224 to transmit data from transducer component 209 to a receiver circuit 226 in transducer component 206. The protocol of serial data is preferably along the lines of the CAN protocol. When an extremely low power transducer component such as a liquid crystal display is coupled to the transducer intraconnection bus, the line 213 can also serve as an energization conductor with the current source 215 providing energization current as well as data current to the liquid crystal display.

In FIG. 7, a regulator circuit 230 in transducer component 209 draws a controlled amount of current from conductor 212 and provided a controlled potential on line 215 for energizing circuits. Receive circuit 222, transmit circuit 224 and circuit 232 are energized by the regulator circuit 230. Circuit 232 comprises memory, an adaptation circuit and a function circuit as described above in connection with FIG. 1. The transmit circuit 224 and the receive circuit 222 of transducer component 209 comprise a modem. The transmit circuit 221 and receive circuit 226 of transducer component 206 comprise a modem.

In FIG. 7, transducer intraconnection bus 200 further comprises conductors 240, 241 coupling between circuit 242 in transducer component 209 and circuit 244 in transducer component 206. The function of conductors 240, 241 can vary depending on the type of transducer components connected together. In one instance, circuit 244 comprises manually actuated switches for setting transducer upper range value and lower range value setting, while circuit 242 senses the switch settings and adjusts the operation of transducer component 209. In another instance, circuit 242 provides alarm signals from circuit 232 in transducer component 209, while the circuit 244 senses those alarm signals and passes them on to circuit 208 on line 246 for transmission over the plant communication bus 202.

The intraconnection bus 200 in FIG. 7 provides a flexible arrangement for interconnecting many variations of transducer components with low power consumption.

Figure 8:
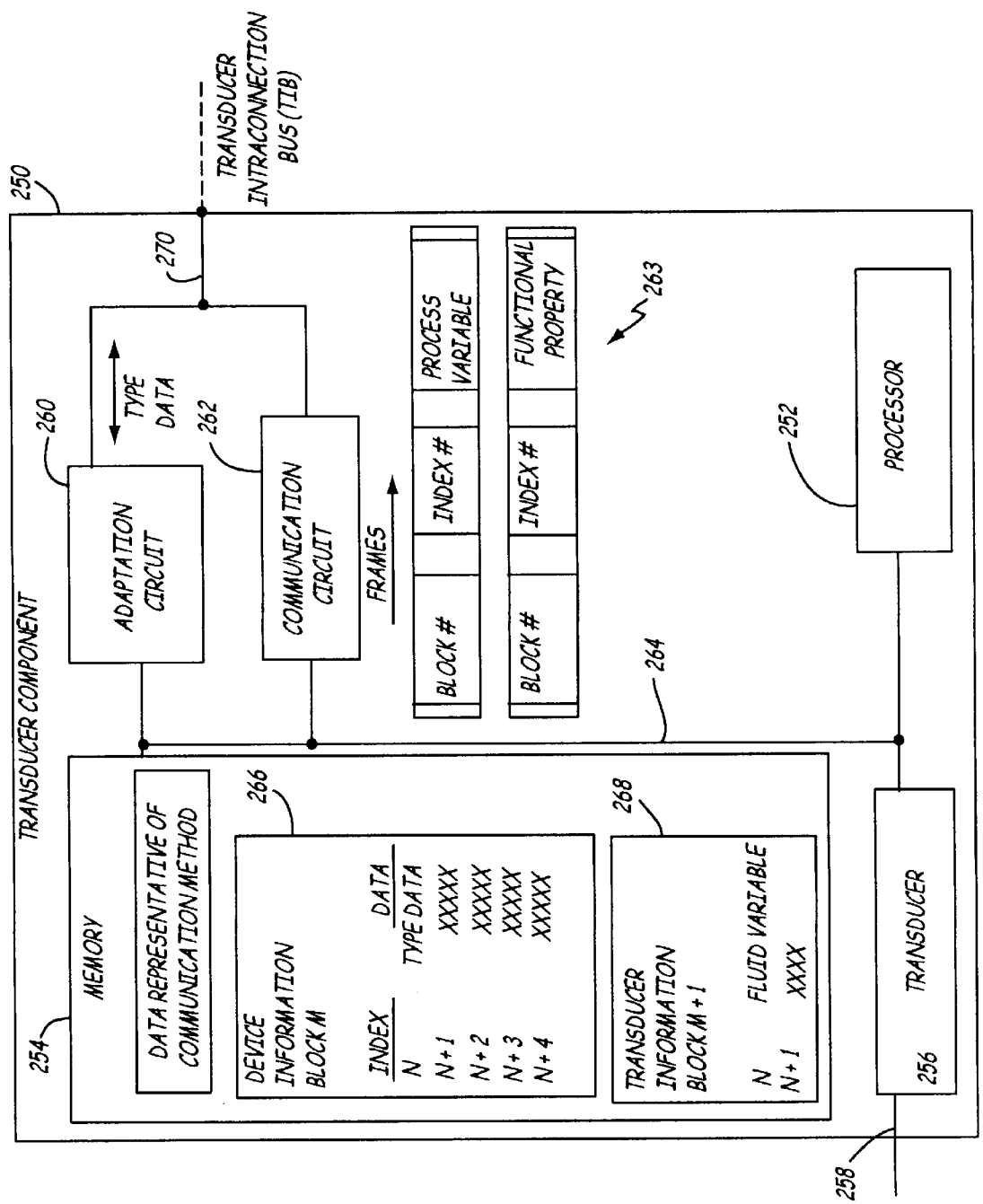
FIG. 8 illustrates a further embodiment of a transducer component that transduces a fluid variable.

In FIG. 8, the communication of data carried on conductor 213 in FIG. 7 is explained in more detail. A transducer component 250 in FIG. 8 comprises a low power processor 252, memory 254, a transducer circuit 256 coupled to a fluid property 258, an adaptation circuit 260 and a communication circuit 262, all coupled together by a low power processor bus 264. The memory 254 includes a block of device data 266 which includes type data and other data concerning the identity and condition of the transducer component 250. The memory 254 also includes a block of ransducer information 268 which includes the most recent sensed value of the fluid property 258 and historical and compensation data relative to the fluid property 258. The adaptation circuit 260 and the communication circuit 262 are coupled to a transducer intraconnection bus 270.

In FIG. 8, communication messages are formatted in frames as shown at 263. Each frame includes data identifying a block number in memory with which the transmitted data is associated, an index number identifying the location of the data with the block, and the actual data in the block which can include process variable data, a functional property and any other available useful data.

Figure 9:
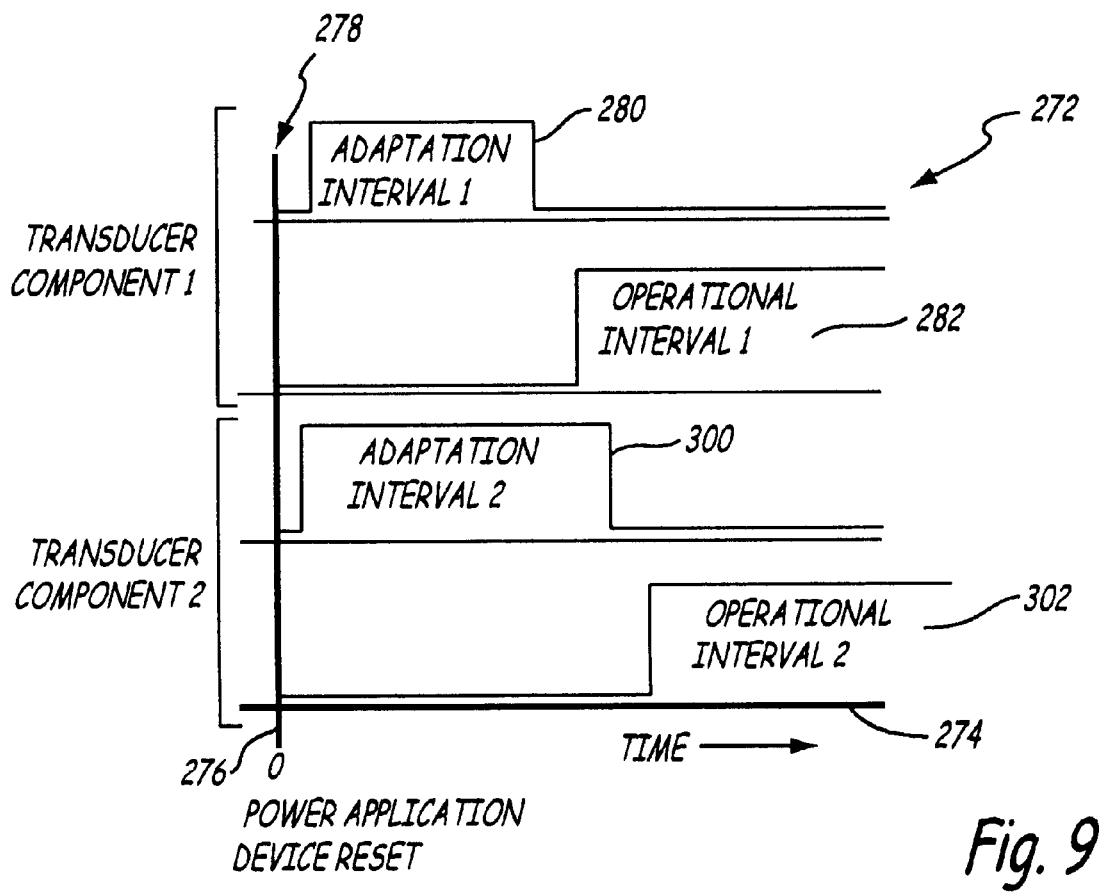
FIG. 9 illustrates an example of timing of adaptation intervals and operational intervals.

In FIG. 9, timing of the activity on transducer intraconnection bus 270 is shown in a timing diagram 272. The timing diagram 272 has a horizontal axis 274 representative of time after time 0 at 276. Time 0 at 276 can be either the time of application of power or the time when a plant bus applies a DEVICE RESET command to simulate reapplication of power. The timing diagram 272 has vertical axes 278 representing whether an interval is active. Activity in transducer component 250 (transducer component 1) illustrates that an adaptation interval 1 at 280 is active after time zero, and is then followed by an operational interval 1 at 282 that is active after the adaptation interval 1 at 280. Transducer component 250, which is a sensor module, automatically generates the adaptation interval 280 after power is applied to the bus. Transducer component 250 also automatically generates the operational interval 282 after the end of the adaptation interval 280.

A second transducer component 2 that is intraconnected to transducer component 1 may also generate adaptation interval 2 at 300 and an operational interval 2 at 302 that are roughly synchronized with corresponding intervals 280, 282 of transducer component 1.

In FIG. 9, when a plant communication bus is connected to at least one of the connected transducer components and provides a DEVICE RESET signal, the sensor module 250 generates the adaptation interval 280 after the plant communication bus generates the DEVICE RESET signal.

During the adaptation intervals 280, 300, the adaptation circuit 260 (FIG. 10) generates an ADAPTATION ADDRESS 290 (FIG. 10) that includes a TYPE address component 292. The ADAPTATION ADDRESS 290 further comprises a PSEUDORANDOM address component 294 sufficiently large to reduce the number of instances of two connected transducer components (transducer component 1, transducer component 2 of FIG. 11) of the same type selecting the same ADAPTATION ADDRESS simultaneously. The number of these instances or "collisions" is reduced to less than 1% of the transducer assembly's adaptation intervals. In the rare instance when two identical ADAPTATION ADDRESSES happen to be selected in a first adaptation interval, the adaptation circuit senses the collision and starts a second adaptation interval. This arrangement allows for each transducer component connected to the transducer intraconnection bus to be uniquely identified with its own adaptation address, even though there may be two transducer components of the same type connected to the bus. This feature makes it possible to conveniently intraconnect two pressure sensor modules, for example.

After each transducer component connected to the transducer intraconnection bus is uniquely identified by an adaptation address, the adaptation interval ends and a SHORT ADDRESS 296 (FIG. 12) is assigned for each connected transducer component. The selected method of communication during the operational interval 282 includes a SHORT ADDRESS 296 that is shorter than the ADAPTATION ADDRESS 290 used during the adaptation interval. The use of a shorter address uses less time on the transducer intraconnection bus and is more efficient to use during the operational interval.

Figure 10:
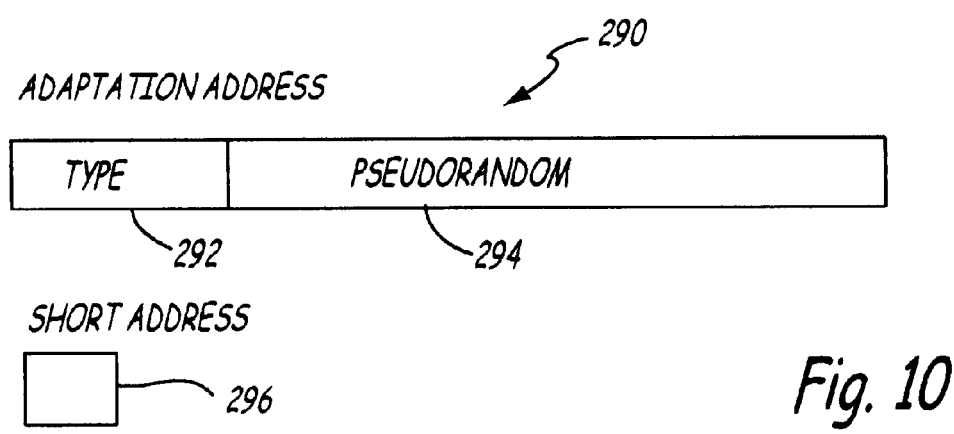
FIG. 10 illustrates an adaptation address and a short address.

In FIGS. 8–10, it is desirable for the TYPE DATA to include MASTER LEVEL data for each transducer component. MASTER LEVEL data represents a rank or preference for each transducer component type relative to other transducer component types to perform the function of a master unit in assigning short addresses. Generally, the transducer component with the greatest amount of processing resources such as memory and processor capability is selected to perform the function of the master unit. MASTER LEVEL data is communicated to the transducer intraconnection bus during the adaptation interval. The adaptation circuit adapts the selected method of communication during the adaptation interval as a function of MASTER LEVEL data communicated from other transducer components. The exchange of data over the transducer intraconnection bus during the adaptation interval comprises peer-to-peer communications.

Messages transmitted on the transducer intraconnection bus during the normal operational interval are preferably broadcast type of messages, where all connected transducer components receive all messages to reduce communication overhead. A transducer component can also generate a READ REQUEST message identifying a second connected transducer component's SHORT ADDRESS and selected current parameters. The second transducer component receives the READ REQUEST and generates a READ RESPONSE including the SHORT ADDRESS and the selected current parameters.

Figure 11:
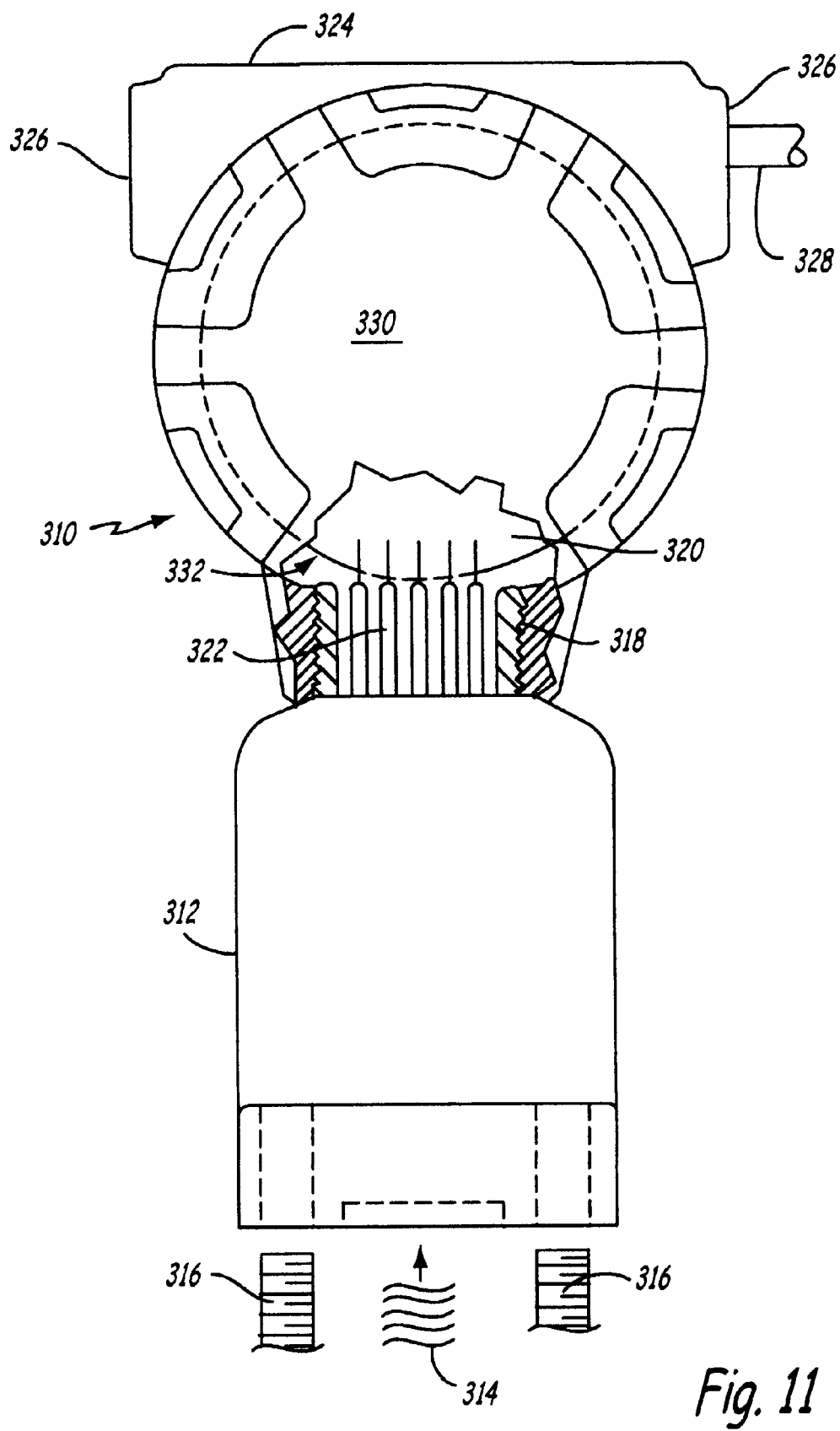
FIG. 11 illustrates an embodiment of a transducer assembly housing.

In FIG. 11, an embodiment of a housing of a transducer assembly 310 is illustrated. Transducer assembly 310 includes a first transducer component 312 which is a sensor module with a sealed housing that couples to a fluid 314 to sense a fluid property such as pressure. Bolts 316 are typically used to attach the transducer component 312 to a process fluid opening or flange surrounding the fluid. Transducer assembly 312 has a threaded connector 318 which serves as a mounting for a second transducer component 320. Connector pins 322 in a sealed electrical feedthrough on transducer component 312 provide conductors of a transducer intraconnection bus between transducer component 312 and transducer component 320. Transducer component 320 is housed in a housing 324 that has electrical conduit openings 326 for receiving a cable 328 carrying the plant interconnection bus. Housing 324 has a removable threaded cover 330 providing access to a cavity 332 in housing 324 into which one or more selected transducer component 320 can be installed. The cavity can, if desired, be divided by a wall to provide two cavities with a feedthrough connector going through the wall and a second cover (not shown) on the back side covering the second cavity. A cover can include a window for viewing a liquid crystal display (LCD), if desired.

Figure 12:
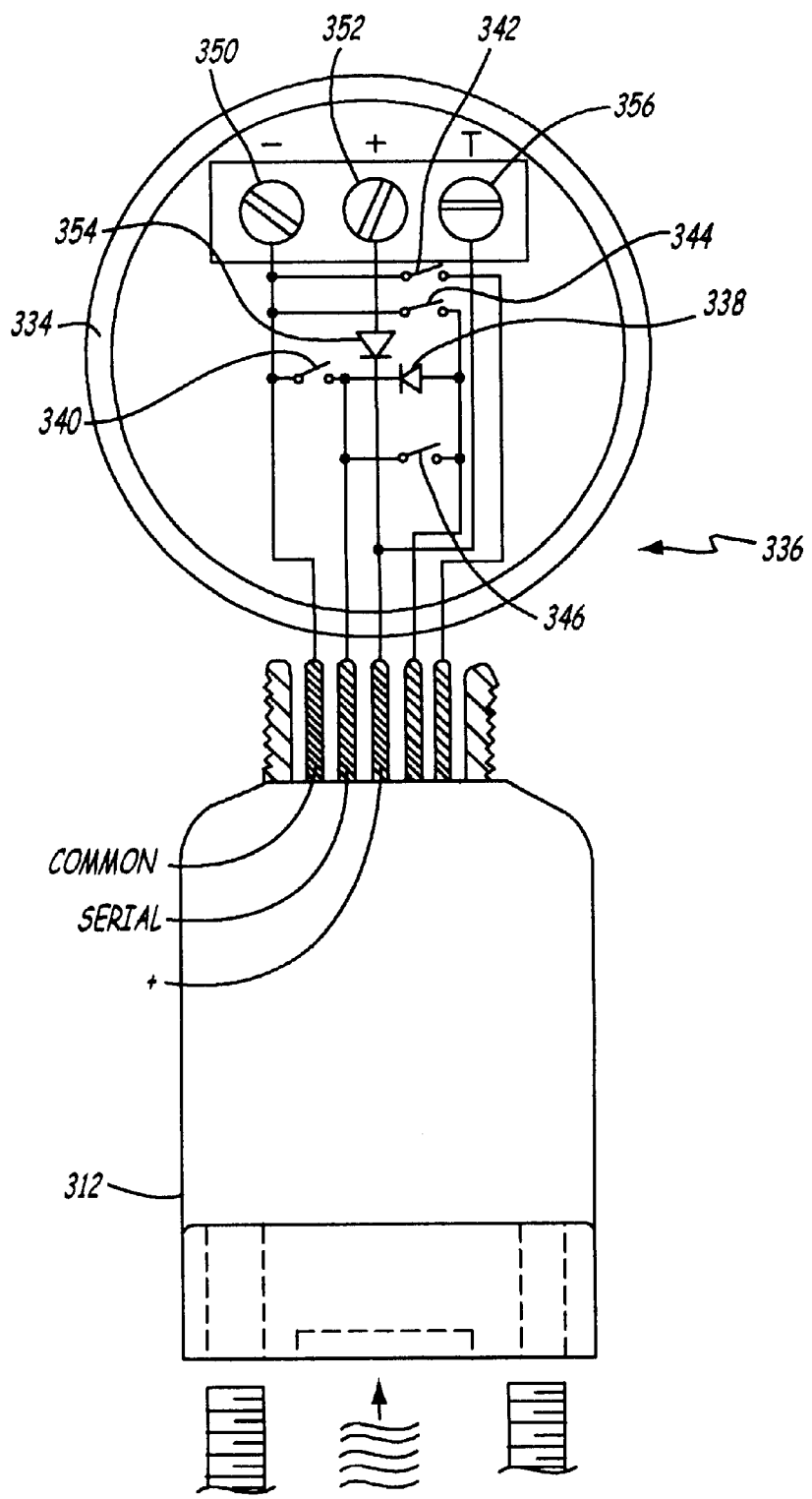
FIG. 12 illustrates an embodiment of a transducer assembly with manual operator controls or switches.

In FIG. 12, a schematic of a terminal block 334 is shown connected to sensor module 312. The transducer assembly shown in FIG. 12 corresponds generally with the transducer assembly 140 shown in FIG. 6.

In FIG. 12, A transducer assembly 336 includes only a single transducer component 312. Transducer component 312 is a sensor module that is field programmable so that, in addition to being able to communicate over an transducer intraconnection bus, it can be also be electrically programmed to alternately provide a 4–20 mA plant interconnection bus type of output, using some of the same connector pins that are otherwise used for the intraconnection bus. Transducer assembly 140 includes only a single transducer component 312 and a terminal block 334 in a housing to form a simple 4–20 mA pressure transmitter. During an adaptation interval, transducer component 312 senses that no other transducer components are present and also senses the diode 338 on terminal block 334. Upon sensing the diode, transducer component 312 programs itself to provide a 4–20 mA plant bus on the common and (+) conductors rather than the transducer intraconnnection bus protocol. In this reprogrammed rrangement, the transducer component 312 accepts eads switch inputs from switches 340, 342, 344, 346 n terminal block 334 for setting span, zero, range nd the like. A 4–20 process control bus is connected to terminals 350, 352. A blocking diode 354 provides reverse polarity protection and its function can be tested at test terminal T at 356.

Figure 13:
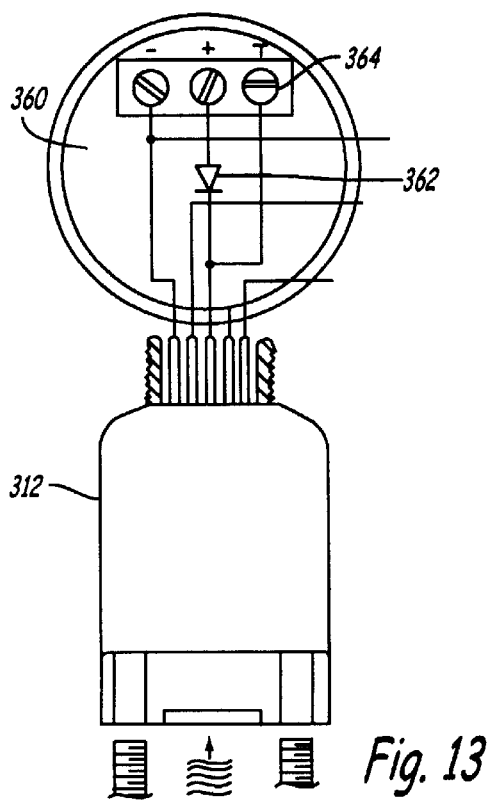
FIG. 13 illustrates an embodiment of a transducer 10 assembly connectable to a 4–20 mA loop.

In FIG. 13, an arrangement is shown in which a transducer component 312 has been electrically programmed to provide a 4–20 mA process control bus output rather than a transducer intraconnection bus. This programming is done via the intraconnection bus using the factory calibration module 134 shown in FIG. 5. After programming, a simple terminal board 360 is added to provide connection to the plant process control bus. Terminal board 360 includes a reverse polarity protection diode 362 and a test terminal 364.

Figure 14:
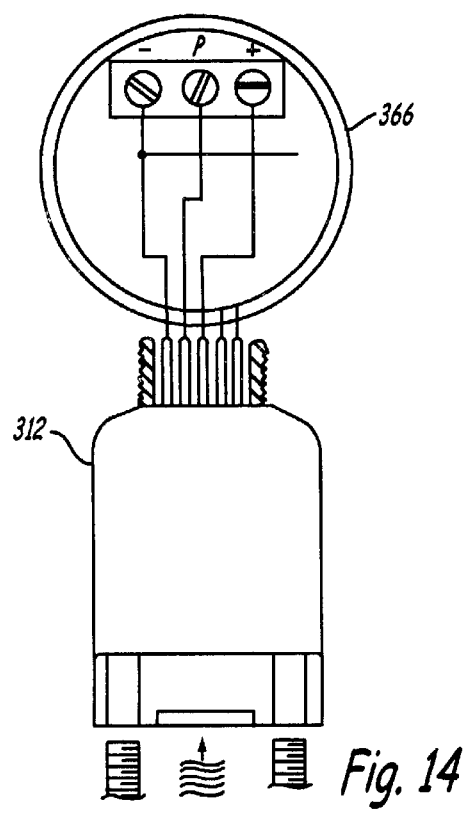
FIG. 14 illustrates an embodiment of a sensor module connected to a terminal strip.

In FIG. 14, an arrangement is shown in which a transducer component 312 is connected to a simple terminal board 366 to provide the common, plus (+) and serial communication conductors on a terminals. This arrangement is used where transducer component 312 is connected to another transducer component a short distance away. The arrangement shown in FIG. 14 corresponds generally to that shown at 60 in FIG. 2 when there are two housings 64A and 64B a short distance apart and connected by a short cable.

Figure 15:
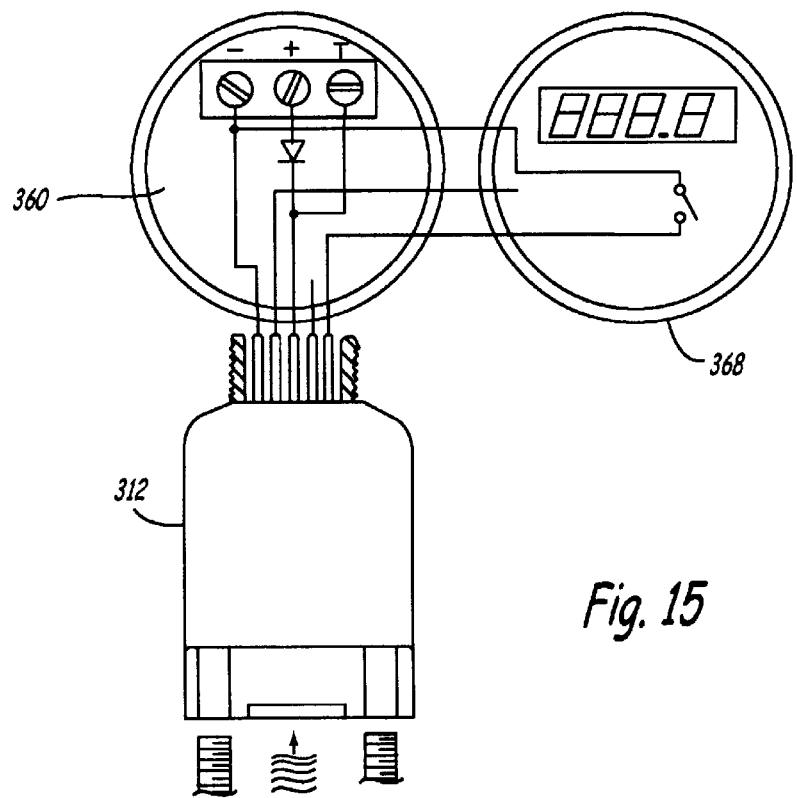
FIG. 15 illustrates an embodiment of a transducer assembly with a liquid crystal display.

In FIG. 15, an arrangement is shown in which a transducer component 312 is connected to a terminal board 360 and also to an LCD display 368 and the serial output is used to energize and control the LCD display 368. The LCD display 368 also includes an alarm switch or indicator, depending on the application.

Figure 16:
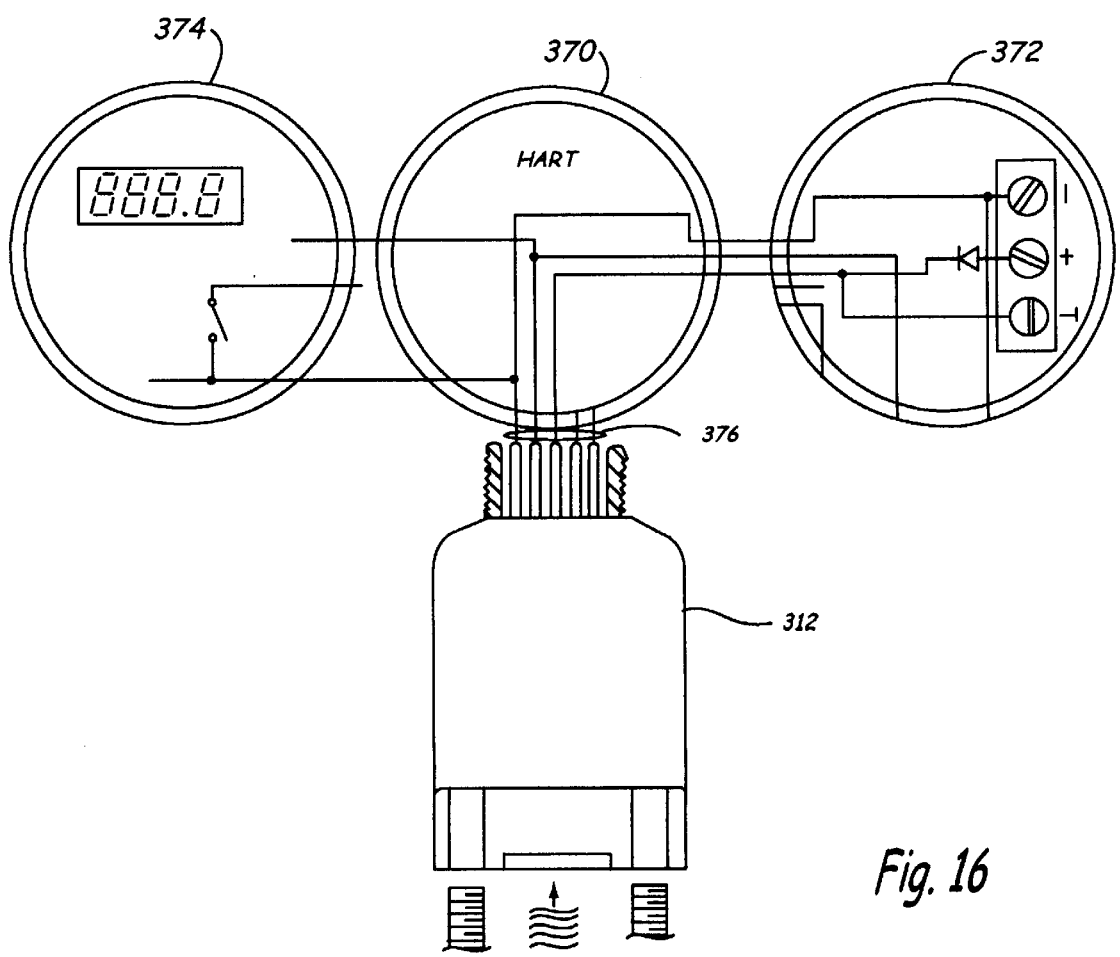
FIG. 16 illustrates an embodiment of a transducer assembly with a HART compatible transducer module.

In FIG. 16, an arrangement is shown in which a transducer component 312 is connected to a HART board 370 (corresponding generally to that shown at 102 in FIG. 4). Transducer component 312 is also connected to a terminal board 372 and an LCD display 374 by a transducer intraconnection bus 376.

Figure 17:
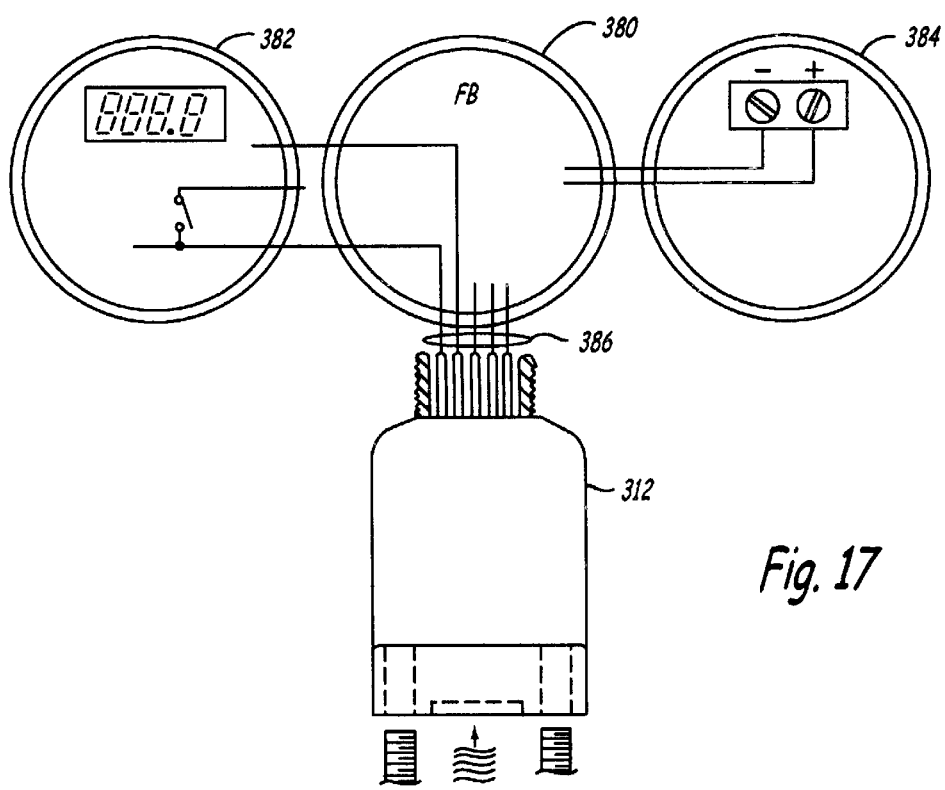
FIG. 17 illustrates an embodiment of a transducer assembly with a FIELDBUS compatible module.

In FIG. 17, an arrangement is shown in which a transducer component 312 is connected to a Fieldbus board 380 (corresponding generally to that shown at 104 in FIG. 4), an LCD display 382 and a simple terminal block 384 by a transducer intraconnnection bus 386.

Figure 18:
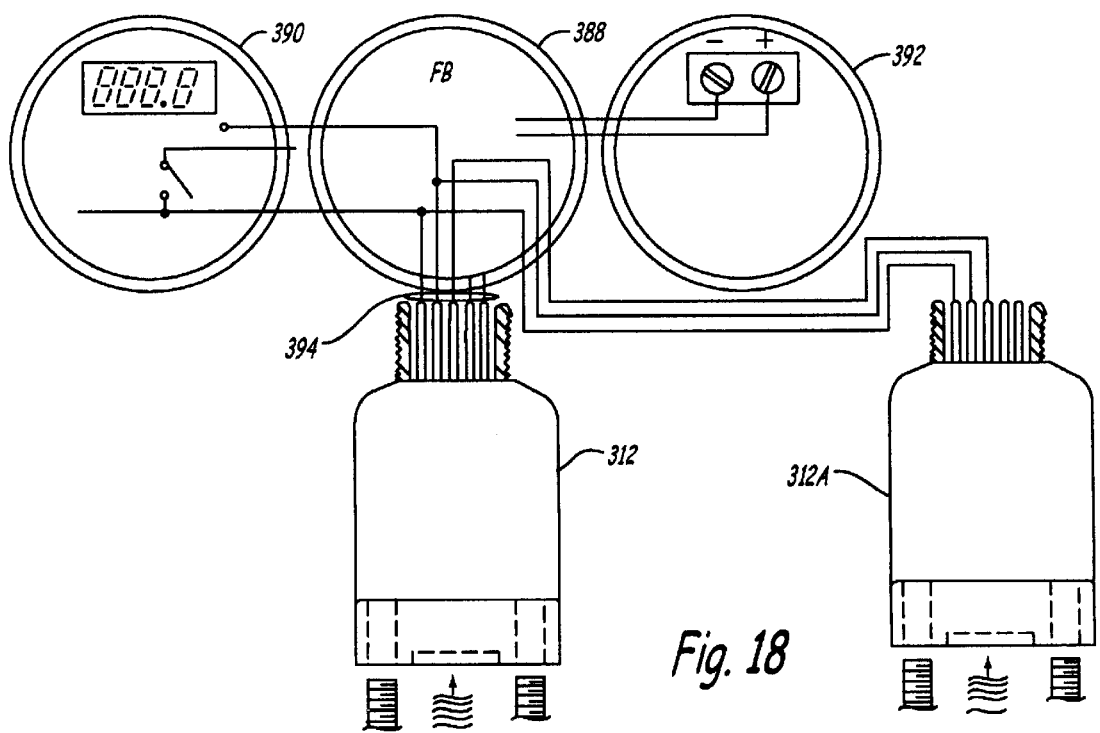
FIG. 18 Illustrates an embodiment of a transducer assembly with two sensor modules.

In FIG. 18, an arrangement is shown in which a transducer component 312 is coupled to a second transducer component 312A, a fieldbus board 388, an LCD display 390 and a terminal block 392 by a transducer intraconnection bus 394.

FIGS. 12–18 illustrate some of the flexibility of configurations that can be obtaining using a transducer intraconnection bus. Interchangeable transducer components can be used to assemble a transducer assembly sensing the desired process variable, providing the desired electrical output, and providing the desired display without incurring the disadvantages of many unwanted features or incompatibilities of different combinations of features encountered with existing transmitters.

Generally, in fluid handling installations such as chemical plants, petroleum and ore refineries, pulp plants, and food processing plants, the condition of fluids is sensed and controlled by a plant control system. A typical plant control system includes transducers interacting with fluids such as pressure transmitters, flow transmitters, control valves, current-to-pressure converters, and also components such as orifice plates, heaters, pumps, motors, temperature sensors and the like that are spatially distributed at plant locations where they interact with a fluid. The plant control system also includes include control equipment, such as a digital control system (DCS) in a control room, or smaller controllers that are spatially distributed in the plant, or control functions such as PID controls that are embedded in computers in the transducers themselves.

Communication of control information over distances between the transducers and control equipment uses plant communication interconnection busses that have many different standardized communication protocols such as 4–20 mA analog loops, digital field protocols such as HART, Foundation Fieldbus, Prof ibus, CAN and the like, and in cases where very long distances are involved, via modem over telephone lines. These busses comprise plant interconnections for the various transducers.

The terms "intraconnection" and "intraconnect" as used in this application refer to conductors that are connected between transducer components within a transducer assembly. The intraconnect conductors are used primarily for connections within a transducer assembly, and are distinguishable from interconnection conductors that are used primarily for long distance connections external to a transducer assembly. An intraconnection conductor will typically be about 100 centimeters or less in length. In contrast, an interconnection conductor will typically be more than 10 meters in length. Some intraconnection conductors may be directly connected to interconnection conductors, however. Intraconnection conductors are run at a power level lower than the power level of the plant bus that energizes the transducer assembly.

The term "transducer assembly" as used in this application means a device with an intraconnection bus and that can transduce one or more fluid properties and that has one or more connections that can be connected to a plant communication bus (interconnection bus) for communication over long distances in a fluid plant to control equipment. The term "transducer assembly" includes an assembly of multiple variable transducer assemblies (sensor modules) that have more than one transducer housing in close proximity to one another connected by an intraconnection bus.

The term "transducer component" as used in this application means a component of a transducer assembly that can be electrically intraconnected to other transducer components.

The term "memory" as used in this application means any arrangement capable of storing data or information that can be read later, including RAM, ROM, EEPROM, Programmable arrays, magnetic memories, mechanical switch setting and other memories ranging from the least volatile to the most volatile memories.

Although the present invention has been described with reference to preferred embodiments, workers skilled in the art will recognize that changes may be made in form and detail without departing from the spirit and scope of the invention. For example, various circuit and functions described can be embodied as hardware, software and firmware or combinations thereof. Various circuits and functions described can be separate or can share common elements of hardware, software or firmware. In particular, the adaptation circuit and communication circuits can share components or be combined into a single circuit.

What is claimed is:

1. A transducer assembly, comprising:

a transducer intraconnection bus;

a limited number of transducer components chosen from a larger number of interchangeable types of transducer components, the limited number of transducer components connecting to the transducer intraconnection bus and including at least one transducer component of a type having a functional variation selected from the group of plant communication protocol, fluid variable, operator control, embedded control and display functional variations;

one of the connected transducer components being a sensor module sensing a fluid variable and having an adaptation circuit that, during an adaptation interval, exchanges type data over the transducer intraconnection bus with other transducer components; and, at the end of the adaptation interval, the sensor module stores data representing a selected method of communication that is adaptable to the types connected; and the sensor module having a communication circuit coupled to the intraconnection bus, the communication circuit using the selected method of communication during an operational interval following the adaptation interval.

2. The transducer assembly of claim 1 wherein the sensor module automatically generates the adaptation interval after power is applied to the bus.

3. The transducer assembly of claim 2 wherein the sensor module automatically generates an operational interval after the end of the adaptation interval.

4. The transducer assembly of claim 1 having a plant communication bus connection connected to at least one of the connected transducer components, and the sensor module generates an adaptation interval after the plant communication bus generates a DEVICE RESET signal.

5. The transducer assembly of claim 1 wherein the sensor module's adaptation circuit generates an ADAPTATION ADDRESS that includes a TYPE address component.

6. The transducer assembly of claim 5 wherein the ADAPTATION ADDRESS further has a PSEUDORANDOM address component sufficiently large to reduce the number of instances of two connected transducer components selecting the same ADAPTATION ADDRESS simultaneously to less than 1% of the transducer assembly's adaptation intervals.

7. The transducer assembly of claim 6 wherein the adaptation circuit senses when two connected adaptation circuit have selected the same ADAPTATION ADDRESS during a first adaptation interval, and starts a second adaptation interval.

8. The transducer assembly of claim 1 wherein transducer components have MASTER LEVEL data stored therein and communicate MASTER LEVEL data to the transducer intraconnection bus during the adaptation interval.

9. The transducer assembly of claim 8 where the adaptation circuit adapts its selected method of communication during the adaptation interval as a function of MASTER LEVEL data communicated from other transducer components.

10. The transducer assembly of claim 1 wherein the selected method of communication during the operational interval includes a SHORT ADDRESS that is shorter than the ADAPTATION ADDRESS used during the adaptation interval.

11. The transducer assembly of claim 1 wherein the exchange of data over the transducer intraconnection bus during the adaptation interval comprises peer-to-peer communications.

12. The transducer assembly of claim 1 wherein the communication circuit in a first connected transducer component generates a message that is a broadcast message.

13. The transducer assembly of claim 12 wherein the communication circuit in a connected transducer component other than the first connected transducer component can receive the broadcast message.

14. The transducer assembly of claim 1 wherein the communication circuit in a first connected transducer component generates a READ REQUEST message identifying a second connected transducer component's SHORT ADDRESS and selected current parameters.

15. The transducer assembly of claim 14 wherein the communication circuit of a second transducer component receives the READ REQUEST and generates a READ RESPONSE including the SHORT ADDRESS and the selected current parameters.

* * * * *

UNITED STATES PATENT AND TRADEMARK OFFICE
CERTIFICATE OF CORRECTION

PATENT NO. : 6,571,132 B1
DATED : May 27, 2003
INVENTOR(S) : Davis et al.

It is certified that error appears in the above-identified patent and that said Letters Patent is hereby corrected as shown below:

<u>Title page,</u>
Item [75], Inventors, add the following:
-- Philip G. Ostby
  Marshall L. Meier
  Darin Peterson
  Steven Brecheisen
  Walter C. Baker
  Ryan Abrhanson --
Item [56], References Cited, U.S. PATENT DOCUMENTS, please add the following:
-- 6,460,094    10/2002    Hanson et al.    710/8 --

Signed and Sealed this

Fifteenth Day of June, 2004

JON W. DUDAS
*Acting Director of the United States Patent and Trademark Office*